United States Patent [19]

Yamashita et al.

[11] Patent Number: 5,615,019

[45] Date of Patent: Mar. 25, 1997

[54] TELEVISION APPARATUS WITH BUILT-IN OPTICAL DISK DEVICE

[75] Inventors: Tomochika Yamashita, Yokohama; Masakazu Hamaguchi, Ebina; Hiroaki Takahashi; Yasuhiro Yakushiji, both of Yokohama; Masashi Ohki, Fujisawa; Kouji Kamogawa, Yokohama, all of Japan

[73] Assignee: Hitachi, Ltd., Tokyo, Japan

[21] Appl. No.: 423,123

[22] Filed: Apr. 14, 1995

[30] Foreign Application Priority Data

Apr. 21, 1994 [JP] Japan ................................. 6-083304

[51] Int. Cl.$^6$ ............................. H04N 5/57; H04N 5/64; H04N 9/097

[52] U.S. Cl. ...................... 386/126; 348/625; 348/606; 348/26; 386/113

[58] Field of Search ..................... 348/54, 606, 625–631, 348/26; 358/322, 342, 335

[56] References Cited

U.S. PATENT DOCUMENTS

| | | | |
|---|---|---|---|
| D. 258,286 | 2/1981 | Ishida et al. ................................. | D14/3 |
| 4,273,342 | 6/1981 | Gilson et al. ............................. | 369/32 |
| 4,733,229 | 3/1988 | Whitehead .............................. | 340/723 |
| 4,982,291 | 1/1991 | Kurashi et al. .......................... | 358/335 |
| 5,214,514 | 5/1993 | Haberkern ............................... | 358/335 |
| 5,396,340 | 3/1995 | Ishii et al. ............................... | 358/342 |
| 5,418,621 | 5/1995 | Park ........................................ | 358/335 |
| 5,434,673 | 7/1995 | Inoue et al. ............................. | 358/335 |
| 5,448,372 | 9/1995 | Axman et al. .......................... | 358/342 |

FOREIGN PATENT DOCUMENTS

| 54-146921 | 11/1979 | Japan . |
|---|---|---|
| 2168776 | 6/1990 | Japan . |

OTHER PUBLICATIONS

Panasonic CD–ROM Notebook Computer brochure.

Primary Examiner—Thai Q. Tran
Assistant Examiner—David R. Vincent
Attorney, Agent, or Firm—Antonelli, Terry, Stout & Kraus, LLP

[57] ABSTRACT

A television apparatus with a built-in optical disk device for reproducing a video signal recorded on an optical disk to make a display. By disposing the optical disk device apart from the high voltage generating section of the television apparatus and an anode electrode of a cathode-ray tube and shielding the optical disk device, influence of dust and noise is reduced. Simultaneously, by reading out a video signal and information concerning the video signal, and optimally controlling video display of the video signal, setting is conducted so as to make flicker at the time of still picture display and block noise and mosquito noise at the time of motion picture display inconspicuous. Video images supplied from the optical disk are thus displayed with a satisfactory quality.

6 Claims, 10 Drawing Sheets

TELEVISION APPARATUS WITH BUILT-IN OPTICAL DISK DEVICE

BACKGROUND OF THE INVENTION

The present invention relates to a television apparatus with a built-in video reproducing device for reproducing video signals from a recording medium, and in particular relates to a television apparatus with a built-in optical disk device suited for reproducing and displaying video signals recorded on an optical disk.

Television apparatuses with a built-in so-called video tape recorder, which uses magnetic tape as a recording medium of video signals and is capable of reproducing and displaying video images easily, are manufactured as products. On the other hand, there have been developed in recent years optical disk devices that record digital video signals on an optical disk, such as a compact disk read only memory (CD-ROM) or a magneto optical disk (MO), instead of on magnetic tape, and the digital video signals are read out by an optical pickup and subjected to digital signal processing to yield video signals.

As for optical disks, there are optical disks called photo CDs, optical disks called CD graphics, and optical disks called video CDs. In the case of photo CDs, natural pictures are recorded as still pictures and the natural pictures are read out, displayed as still images on a television apparatus, and electronically filed. In the case of CD graphics, graphic data are recorded in empty regions of music CDs (compact disks) and read out to reproduce sounds and graphic video images. In the case of video CDs, video signals of motion pictures (hereafter referred to as motion picture signals) are recorded and read out to display motion pictures on a television apparatus. Especially in video CDs, motion picture signals have been recorded as data-compressed digital signals.

In conventional VTRs, special regard has not been paid to dust because magnetic tape is used as a recording medium of video signals. On the other hand, when optical disks are used, sufficient regard should be paid to dust, because optical pickups are used. Furthermore, when optical disks are used, regard should be paid to noise as well, because digital signal processing circuits are used.

Furthermore, when a photo CD is reproduced and a still picture is displayed, a television display method of scanning a display screen 60 alternately along first scanning lines 61 and second scanning lines 62, each disposed every two lines, as shown in FIG. 1 is used. Therefore, the still picture flickers with a period of the alternate scanning of the first scanning lines 61 and the second scanning lines 62. In this case, line flicker thus becomes conspicuous. Furthermore, when motion picture signals, data-compressed according to MPEG (Motion Picture Expert Group) standards, are read out from a video CD to display motion pictures, there is a problem that block noise and mosquito noise become conspicuous, and the image quality is significantly degraded. These noises are caused by the motion picture signals having been subjected to digitization and data compression, and when motion pictures are to be displayed the motion picture signals are subjected to digital processing and then are subjected to signal processing in a video signal processing circuit in the same way as received video signals. Mosquito noise is caused in contour portions of images, whereas block noise is caused in remaining flat-luminance portions.

For example, in the case of a scene such as an automobile 70 moving in a direction indicated by an arrow as shown in FIG. 2, lattice block noise 72 is caused in a portion of the background 71 having a flat pattern, whereas mosquito noise 73, looking like flying insects, is caused in a boundary between the automobile 70 and the background 71.

In case of the MPEG standards, video signals are subjected to data compression processing for each of a plurality of regions that are obtained by dividing the screen. Each region is a block. If a block is thus used as the unit of data compression, a data value slightly different from its original value occurs between adjacent blocks when each block is subjected to data expansion processing to restore the original data value. On the display screen, therefore, such a lattice image as to set a frame to each block slightly occurs. This lattice image is the block noise.

SUMMARY OF THE INVENTION

A principal object of the present invention is to provide a television apparatus with a built-in optical disk device capable of eliminating the problems concerning dust and noise.

Another object of the present invention is to provide a television apparatus with a built-in optical disk device capable of making a display suitable for the kind of a video image such as CD graphic, photo CD, or video CD on the basis of information concerning the video signal supplied from the optical disk device.

In accordance with the present invention, the optical disk device is disposed apart from a high voltage generating section of a cathode-ray tube and a tuner circuit susceptible to noise in order to achieve the principal object.

Furthermore, in accordance with the present invention, the optical disk device is shielded in order to achieve the principal object.

In accordance with the present invention, video signals and information concerning them are read out from the optical disk device to optimally control video display of the video signals in order to achieve the other object.

The high voltage generating section attracts dust. Since the optical disk device is disposed apart from the high voltage generating section, dust does not come to the optical disk device.

When video signals recorded as digital signals are read out from a video CD in the optical disk device, noise is apt to be generated when the read out digital video signals are subjected to digital processing. The tuner circuit is susceptible to noise because it deals with received weak signals. Since the optical disk device is disposed apart from the tuner circuit, however, the influence of noise on the tuner circuit is reduced, even if the optical disk device is built in a television apparatus.

Furthermore, since the optical disk device is shielded, the optical disk device is protected against dust. Even if the optical disk device is disposed near the high voltage generating section, therefore, a problem is not especially posed. By making the shield conductive, noise generated in the digital processor of the optical disk device does not come out of the optical disk device. Therefore, the optical disk device can be disposed even near the tuner circuit. By doing so, therefore, restrictions on disposition of the optical disk device in the television apparatus can be significantly relaxed.

Furthermore, in addition to video signals, information concerning the video signals is also supplied to the display section. Therefore, video signals can be displayed optimally. As a result, display conditions can be set so as to prevent flicker at the time of still picture display and to prevent block noise and mosquito noise at the time of motion picture display from becoming conspicuous. Video images supplied from the optical disk can be displayed with a satisfactory quality.

BRIEF DESCRIPTION OF THE DRAWINGS

Preferred embodiments of the present invention will now be described in conjunction with the accompanying drawings, in which:

FIGS. 8A and 8B are diagrams showing a sixth embodiment of a television apparatus with a built-in optical disk device according to the present invention, in which FIG. 8A is a front view, and FIG. 8B is a sectional view seen along VIIIB—VIIIB in FIG. 8A;

DESCRIPTION OF THE PREFERRED EMBODIMENTS

Hereafter, embodiments of the present invention will be described by referring to drawings.

Figure 1:
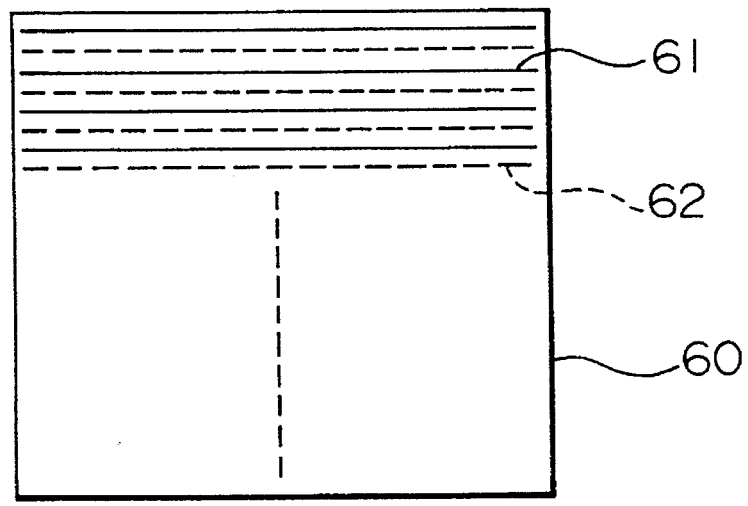
FIG. 1 is a diagram illustrating line flicker in a still picture.
Figure 2:
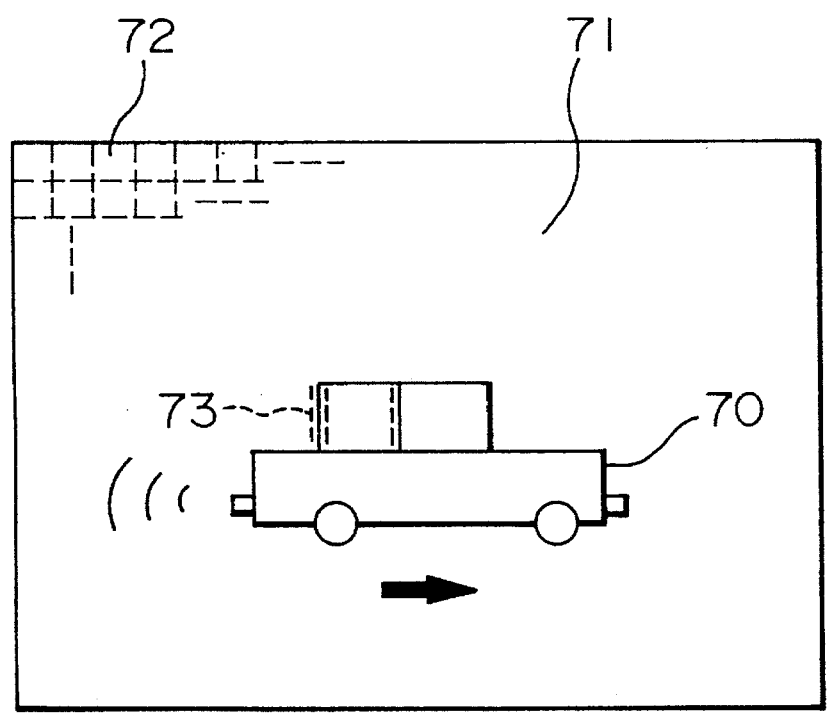
FIG. 2 is a diagram illustrating mosquito noise and block noise.
Figure 3:
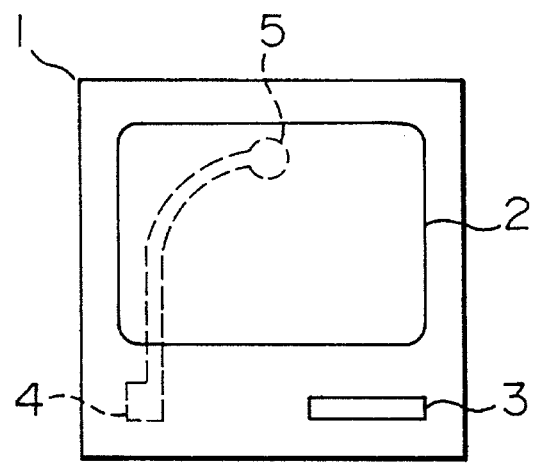
FIG. 3 is a front view showing a first embodiment of a television apparatus with a built-in optical disk device according to the present invention.

FIG. 3 is a front view showing a first embodiment of a television apparatus with a built-in optical disk device according to the present invention. Numeral 1 denotes a television apparatus with a built-in optical disk device of this embodiment. Numeral 2 denotes a television receiving and display section, 3 an optical disk device, 4 a high voltage generating section of a cathode-ray tube, and 5 an anode electrode of the cathode-ray tube.

In FIG. 3, the television receiving and display section 2, having a configuration similar to that of conventional television receivers, and the optical disk device 3 are built in the same casing. In the television receiving and display section 2, high voltage generated by the high voltage generating section 4 is applied to the anode electrode 5 of the cathode-ray tube. Therefore, these sections are apt to attract dust. In this embodiment, therefore, the optical disk device 3, which is susceptible to dust, is disposed in a lower position apart from the high voltage generating section 4 and the anode electrode 5 of the cathode-ray tube.

Owing to the configuration heretofore described, influence of dust on the optical disk device 3 can be reduced.

Figure 4:
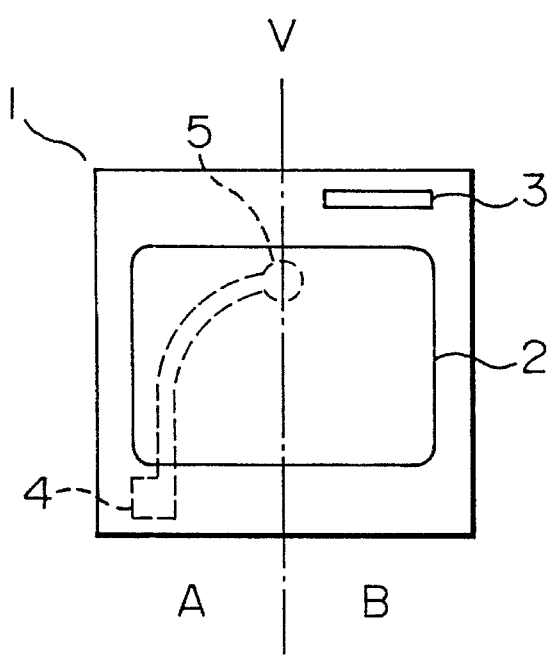
FIG. 4 is a front view showing a second embodiment of a television apparatus with a built-in optical disk device according to the present invention.

FIG. 4 is a front view showing a second embodiment of a television apparatus with a built-in optical disk device according to the present invention. Components corresponding to those of FIG. 3 are denoted by like numerals, and duplicated description of them will be omitted.

In FIG. 4, the optical disk device 3 is disposed in a top part of a side (side B) which is on the opposite side of a vertical plane V passing through the center of a television receiving and display section 2 of the television apparatus 1 with a built-in optical disk device, from a side (side A) including the high voltage generating section 4 and the anode electrode 5 of the cathode-ray tube. In the same way, therefore, the influence of dust on the optical disk device can be reduced.

Figure 5:
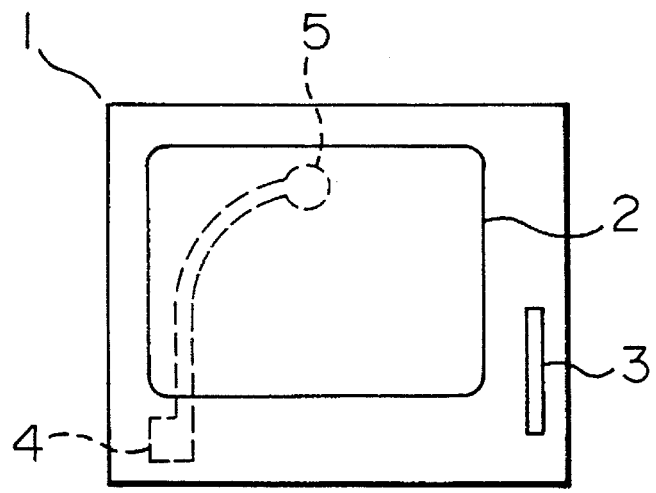
FIG. 5 is a front view showing a third embodiment of a television apparatus with a built-in optical disk device according to the present invention.

FIG. 5 is a front view showing a third embodiment of a television apparatus with a built-in optical disk device according to the present invention. Components corresponding to those of FIG. 3 are denoted by like numerals, and duplicated description of them will be omitted.

In FIG. 5, the optical disk device is disposed near the side of the television apparatus 1 so as to be apart from the high voltage generating section 4 and the anode electrode 5 of the cathode-ray tube. In the same way as the embodiment shown in FIG. 3, the influence of dust on the optical disk device can be reduced.

Figure 6:
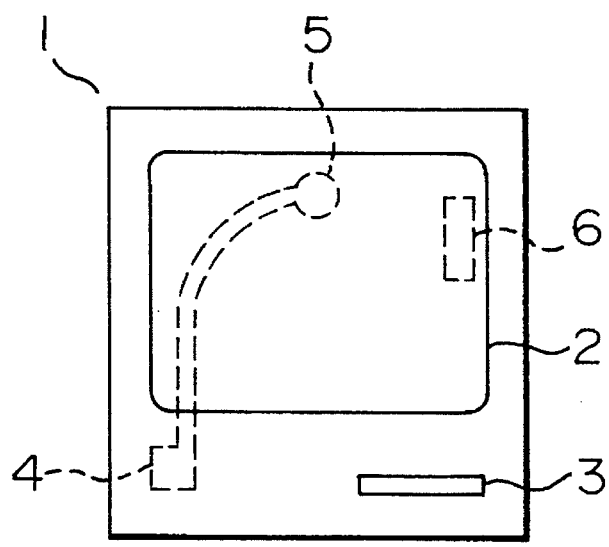
FIG. 6 is a front view showing a fourth embodiment of a television apparatus with a built-in optical disk device according to the present invention.

FIG. 6 is a front view showing a fourth embodiment of a television apparatus with a built-in optical disk device according to the present invention. Numeral 6 denotes a tuner circuit. Components corresponding to those of FIG. 3 are denoted by like numerals, and duplicated description of them will be omitted.

In FIG. 6, the tuner circuit 6 is susceptible to the influence of noise because it handles weak signals. On the other hand, the optical disk device 3 is apt to generate noise because it conducts digital signal processing. Therefore, the optical disk device 3 is disposed apart from the high voltage generating section 4 and the anode electrode 5 and from the tuner circuit 6. As a result, the influence of dust on the optical disk device 3 can be reduced in the same way as the first embodiment shown in FIG. 3 and in addition, the influence of noise on the tuner circuit 6 can also be reduced.

In the embodiment shown in FIG. 6, the optical disk device 3 may be disposed as shown in FIG. 4 or FIG. 5, and in such case as well the same effect can be obtained.

Figure 7:
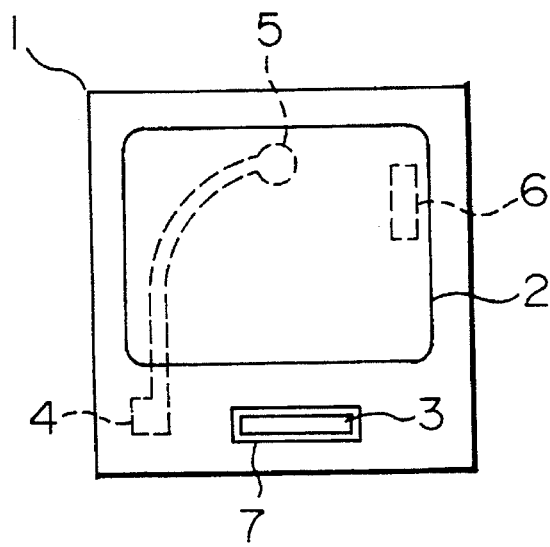
FIG. 7 is a front view showing a fifth embodiment of a television apparatus with a built-in optical disk device according to the present invention.

FIG. 7 is a front view showing a fifth embodiment of a television apparatus with a built-in optical disk device according to the present invention. Numeral 7 denotes a shield member. Components corresponding to those of FIG. 6 are denoted by like numerals, and duplicated description of them will be omitted.

In FIG. 7, the optical disk device 3 is shielded by the shield member 7. As this shield member 7, either a nonconductive one or a conductive one may be used. In either case, dust attracted by the high voltage generating section 4 and the anode electrode 5 is interrupted by this shield member 7 and cannot enter the optical disk device 3. Therefore, a problem is not especially posed even if the optical disk device 3 is disposed near the high voltage generating section 4 and the anode electrode 5. Furthermore, if the shield member 7 is made conductive and connected to the ground, noise generated by the optical disk device 3 is prevented by the shield member 7 from being emitted to the outside. Therefore, a problem is not especially posed, even if the optical disk device 3 is disposed near the tuner circuit 6.

In this embodiment, the optical disk device can thus be disposed in an arbitrary position of the television apparatus 1 with a built-in optical disk device. Restrictions on the disposition of the optical disk device are significantly relaxed.

Figure 8A:
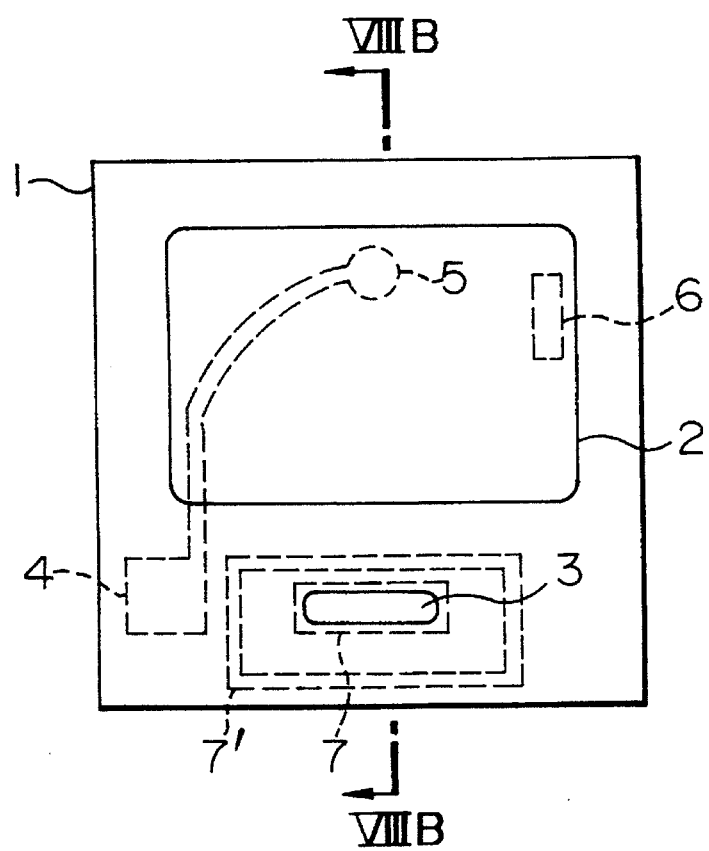
Figure 8B:
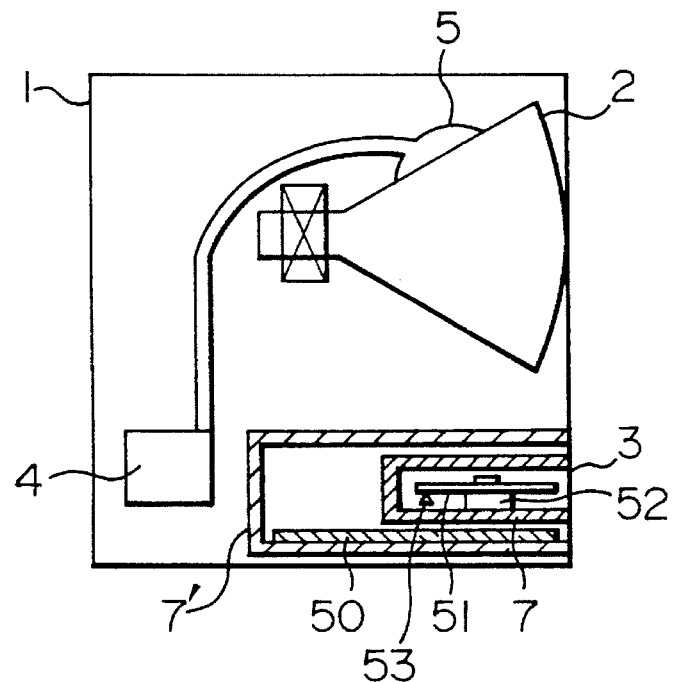

FIGS. 8A and 8B are diagrams showing a sixth embodiment of a television apparatus with a built-in optical disk device according to the present invention. FIG. 8A is a front view. FIG. 8B is a sectional view seen along a section line VIIIB—VIIIB of FIG. 8A. Characters 7' denotes a shield member, 50 a circuit board, 51 an optical disk, 52 a disk motor, and 53 a laser pickup. Components corresponding to those of FIG. 7 are denoted by like numerals, and duplicated description of them will be omitted.

In FIGS. 8A and 8B, the optical disk 51 having digital data such as video images and speech recorded thereon, the disk motor 52 for driving and rotating the optical disk 51, and the laser pickup 53 for optically reading out digital data recorded on the optical disk 51 are shielded a shield member 7. Furthermore, the entire optical disk device 3 including a circuit for processing reproduced signals supplied from the optical disk in a shield section using such a shield member 7 is shielded by a shield member 7'.

By using such a configuration, the optical disk device 3 is doubly shielded by the shield members 7 and 7'. As the shield members 7 and 7', either a nonconductive one or a conductive one may be used. Dust attracted by the high voltage generating section 4 and the anode electrode 5 is interrupted by the shield members 7 and 7' and cannot enter the optical disk device 3. Therefore, a problem is not especially posed, even if the optical disk device 3 is disposed near the high voltage generating section 4 and the anode electrode 5. Furthermore, by making the shield members 7 and 7' conductive, noise generated in the optical disk device 3 is not emitted to the outside. Therefore, a problem is not especially posed, even if the optical disk device 3 is disposed near the tuner circuit 6.

Furthermore, a double shield structure is formed by the shield members 7 and 7'. Thereby, it is possible to further prevent attachment of dust to a lens face of the laser pickup 53. Thus, readout errors in reading out digital data recorded on the optical disk can be significantly reduced. In case the shield members 7 and 7' are made conductive, it is possible to prevent electromagnetic noise generated by the disk motor 52 and noise generated by a television circuit from exerting an influence on the circuit board 50.

Furthermore, in the same way as the fifth embodiment, the optical disk device 3 can be disposed in an arbitrary position in the television apparatus 1 with the built-in optical disk device. Restrictions on the disposition of the optical disk device 3 are significantly relaxed.

Figure 9:
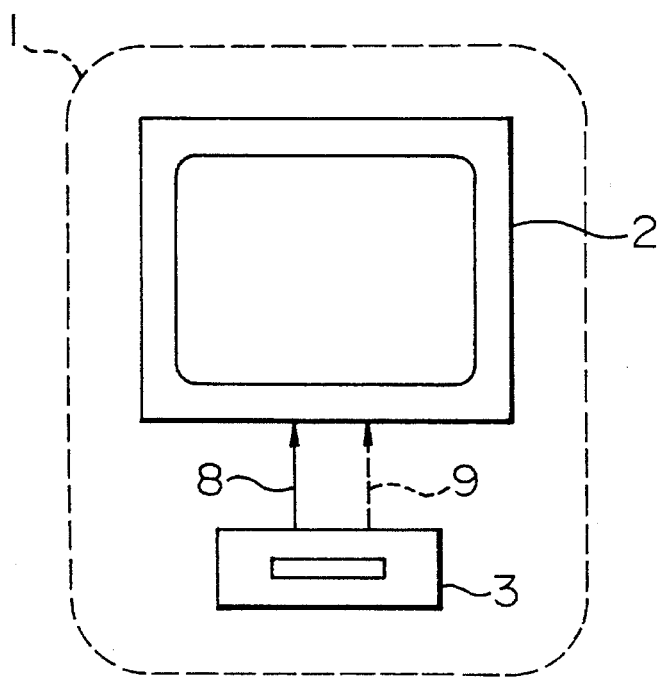
FIG. 9 is a front view showing a seventh embodiment of a television apparatus with a built-in optical disk device according to the present invention.

FIG. 9 is a front view showing a seventh embodiment of a television apparatus with a built-in optical disk device according to the present invention. Numeral 8 denotes a video signal read out from the optical disk device 3. Numeral 9 denotes control information read out concerning the the video signal 8. Components corresponding to those of FIG. 3 are denoted by like numerals, and duplicated description of them will be omitted.

This embodiment makes it possible to display, with a high image quality, video images reproduced from the optical disk.

In conventional television apparatuses, only a video signal 8 shown in FIG. 9 is read out from the optical disk device 3, and merely the video images are displayed on a display screen of a cathode-ray tube of a television receiving and display section 2. Display control depending upon contents of the video signal 8 is not exercised. Or a judgment is formed on the basis of the inputted video signal. In conventional television apparatuses, therefore, accurate control cannot be exercised.

In this embodiment, however, the optical disk device 3 reproduces the video signal 8 by using digital signal processing. Therefore, contents of the video signal 8 can be judged accurately. On the basis of its control information 9, video image display in the television receiving and display section 2 can be controlled optimally.

Control information 9 indicating whether the video signal 8 is a still picture signal or a motion picture signal is supplied to the television receiving and display section 2. For example, therefore, in case the video image read out from the optical disk is a still picture, line flicker is conspicuous, and hence the screen is darkened to make line flicker inconspicuous. In case of a motion picture, the screen is darkened and contour processing is weakened to make block noise and mosquito noise inconspicuous. In case of a video image of a video signal received by the tuner circuit, the above described problems are not posed, and hence the screen is brightened to modulate the image for effect, and contour processing is enhanced. Thus, video images of high quality can be displayed by controlling the brightness of the display screen and picture quality adjustment.

Figure 10:
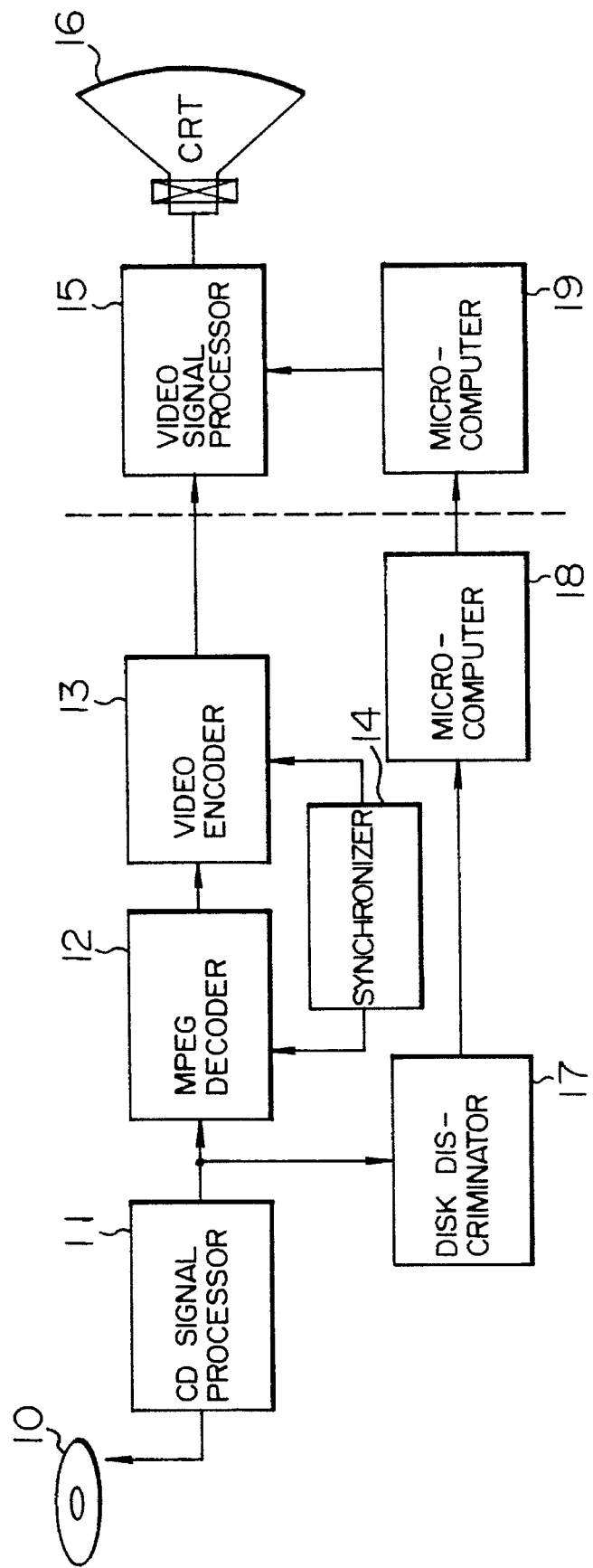
FIG. 10 is a block diagram showing a concrete example of a signal processing system for reproduced signals of an optical disk in the embodiment shown in FIG. 9.

FIG. 10 is a block diagram showing a concrete example of a signal processing system of a signal reproduced from the optical disk in this embodiment. Numeral 10 denotes an optical disk, 11 a CD signal processor, 12 a MPEG decoder, 13 a video encoder, 14 a synchronizer, 15 a video signal processor, 16 a cathode-ray tube, and 17 a disk discriminator. Numerals 18 and 19 denote microcomputers.

In FIG. 10, the optical disk 10 is a compact disk (CD) having digital speech information recorded thereon, a CD graphic having animation-like still pictures successively recorded thereon so as to form one story, for example, and speech information concerning them recorded thereon, a photo CD having a natural picture recorded as a still picture as in a photograph film, or a video CD having motion picture video signals and speech signals digitized, data-compressed according to the MPEG standards, and recorded thereon.

A signal reproduced from the optical disk 10 by an optical pickup which is not illustrated is processed in the CD signal processor 11 and then supplied to the MPEG decoder 12. Assuming now that the optical disk 10 is a video CD according to the MPEG standards, the signal supplied to the MPEG decoder 12 is subjected to data expansion therein to restore a digital video signal having its original data value, and a horizontal synchronizing signal and a vertical synchronizing signal supplied from the synchronizer 14 are added thereto. Such a video signal includes a luminance signal and a color difference signal. Such a video signal is converted in the video encoder 13 to a composite color video signal having a luminance signal and a color difference signal multiplexed thereto and is converted to an analog signal having the same signal form as the received composite color video signal.

The composite color video signal outputted from the video encoder 13 is supplied to the video signal processor 15 for processing the received composite color video signal, subjected to processing such as amplification of the luminance signal and contour processing, and subjected to processing such as demodulation of the color difference signal. A signal outputted from the video signal processor 15 is supplied to the cathode-ray tube 16. A video image is displayed on the screen of the cathode-ray tube 16.

For each of the CD, CD graphic, and photo CD as well, a processing circuit is provided. The reproduced signal is processed by the CD signal processor 11, and then processed in a corresponding processor. In case of the CD, the processed signal is supplied to a speech circuit which is not illustrated. In case of the CD graphic and photo CD, the processed signal is supplied to the video signal processor 15.

On the other hand, on the optical disk 10 as heretofore described, information indicating the kind of the optical disk is recorded in a top portion of the recording area as disk discrimination information. When reproduction of the optical disk 10 is started, this discrimination information is always read out. The reproduced signal supplied from the CD signal processor 11 is supplied to the disk discriminator 17 as well. Disk discrimination information is thus extracted, and the kind of the optical disk 10 under now reproduction is discriminated. The result of discrimination is sent to the microcomputer 18. The microcomputer 18 sends a control command based upon this discrimination result to the microcomputer 19. This microcomputer 19 is a typical microcomputer for television disposed in conventional television receivers to control the tuner circuit, for example. In this embodiment, the microcomputer 19 also controls luminance signal contrast and contour processing in the video signal processor 15.

Assuming now that the optical disk 10 is a photo CD, the disk discriminator 17 discriminates it. On the basis of a control command sent from the microcomputer 18, the microcomputer 19 controls the video signal processor 15 to lower the contrast and make the screen of the cathode-ray tube 16 darker than the normal state. As a result, line flicker of a still picture displayed on the screen of the cathode-ray tube 16 becomes inconspicuous.

Assuming now that the optical disk 10 is a video CD, the disk discriminator 17 discriminates it. On the basis of a control command sent from the microcomputer 18, the microcomputer 19 controls the video signal processor 15 to lower the contrast, make the screen of the cathode-ray tube 16 darker than the normal state, and lower the degree of contouring as compared with the normal state. As a result, block noise and mosquito noise become inconspicuous.

Figure 11:
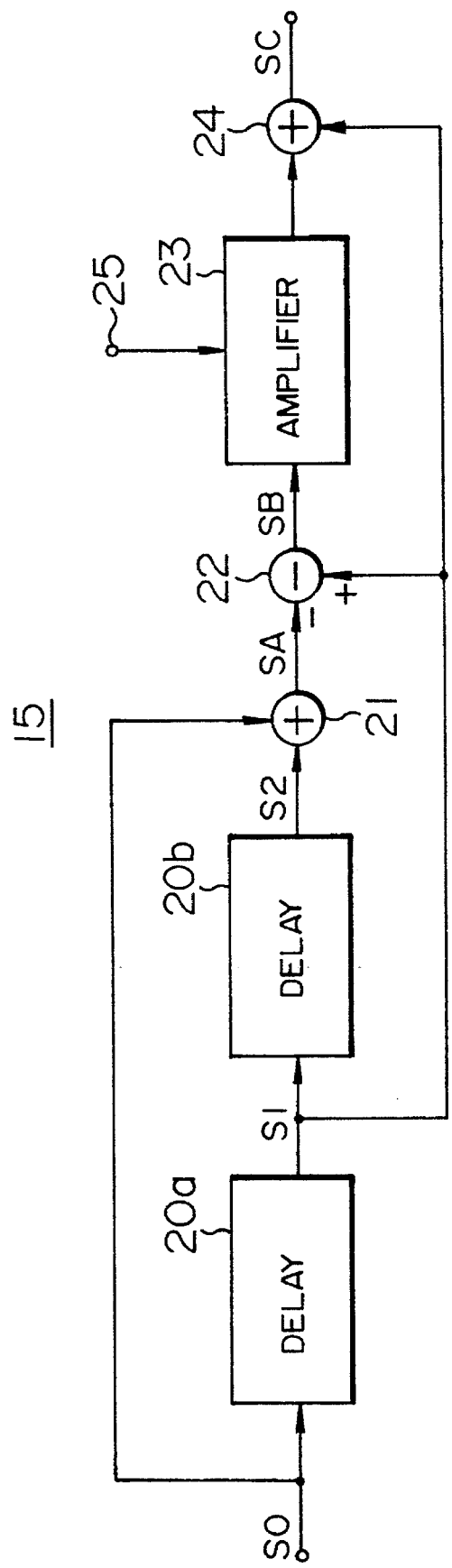
FIG. 11 is a circuit diagram showing a concrete example of a contour circuit which can be used in a video signal processing circuit of FIG. 10.

FIG. 11 is a circuit diagram showing a concrete example of a contour circuit which can be used in the video signal processor 15. In FIG. 11, 20a and 20b denote delay circuits, 21 an adder, 22 a subtracter, 23 a variable gain amplifier, 24 an adder, and 25 an input terminal.

Figure 12:
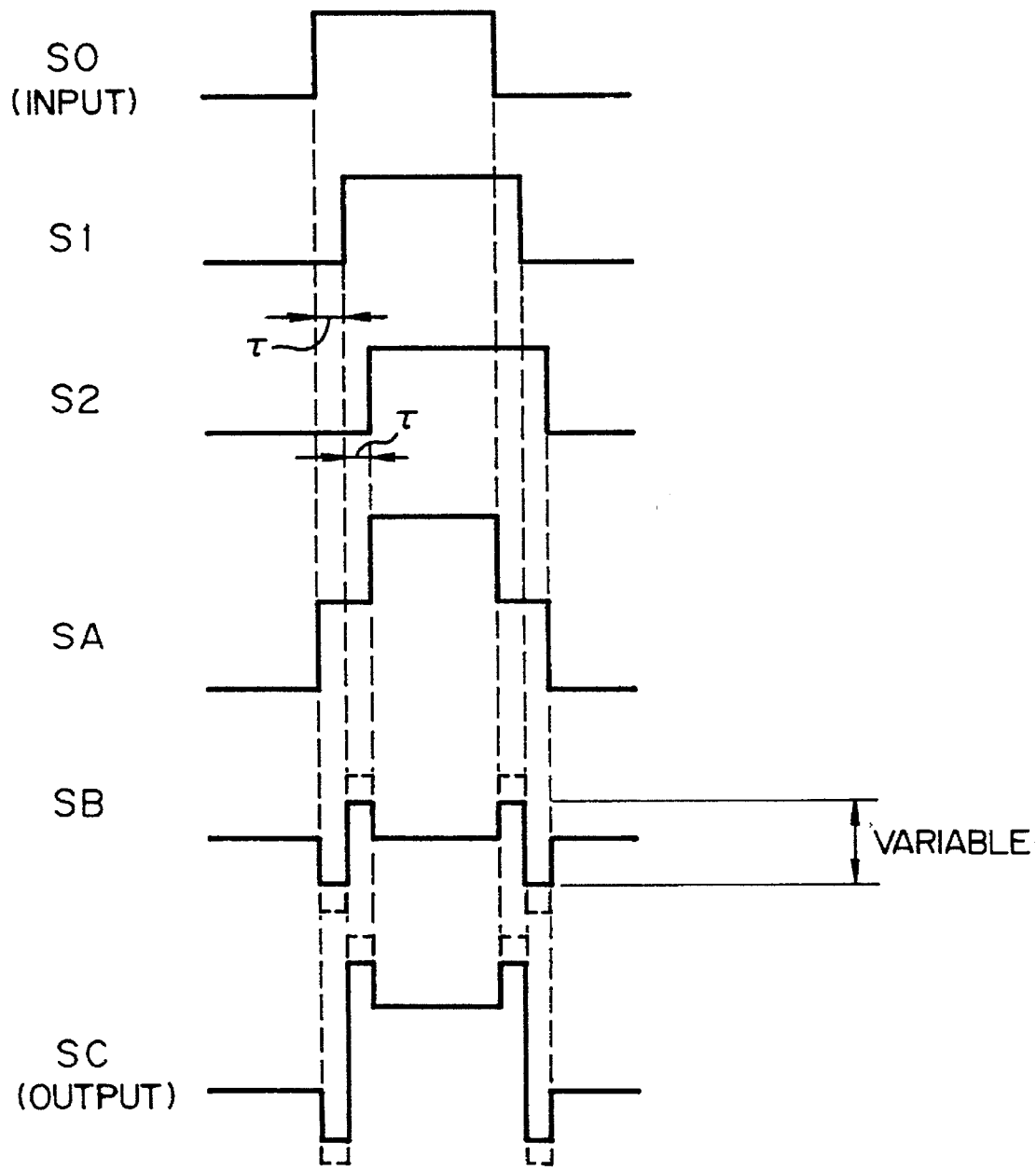
FIG. 12 is a waveform diagram showing signals of various positions in FIG. 11.

FIG. 12 is a waveform diagram showing signals in various positions of FIG. 11. Components corresponding to those of FIG. 11 are denoted by like characters.

With reference to FIGS. 11 and 12, an inputted luminance signal S0 is successively delayed by minute times $\tau$ in the delay circuits 20a and 20b. A luminance signal S2 delayed by 2 $\tau$ and the input luminance signal S0 are added together in the adder 21. In the subtracter 22, an output signal SA of the adder 21 is subtracted from a luminance signal S1 delayed by $\tau$ and outputted from the delay circuit 20a. A resultant contour signal SB has a waveform obtained by deriving the second derivative of the contour of the delayed luminance signal S1 and inverting a resultant waveform.

Such a contour signal SB is supplied to the variable gain amplifier 23. The variable gain amplifier has a gain which is controlled by a gain control signal supplied from the microcomputer 19 of FIG. 10 via the input terminal 25. This gain is set to a smaller value when the optical disk 10 is a video CD as compared with when the optical disk 10 is not a video CD. Therefore, this contour signal has a smaller amplitude when the optical disk 10 is a video CD as compared with when the optical disk 10 is not a video CD.

The contour signal SB thus subjected to amplitude adjustment is added to the luminance signal S1 supplied from the delay circuit 20a. As a result, a luminance signal SC emphasized in contour is obtained.

In this concrete example, the contour action is thus lowered when the optical disk 10 is a video CD. Therefore, block noise and mosquito noise become inconspicuous on the screen.

Figure 13:
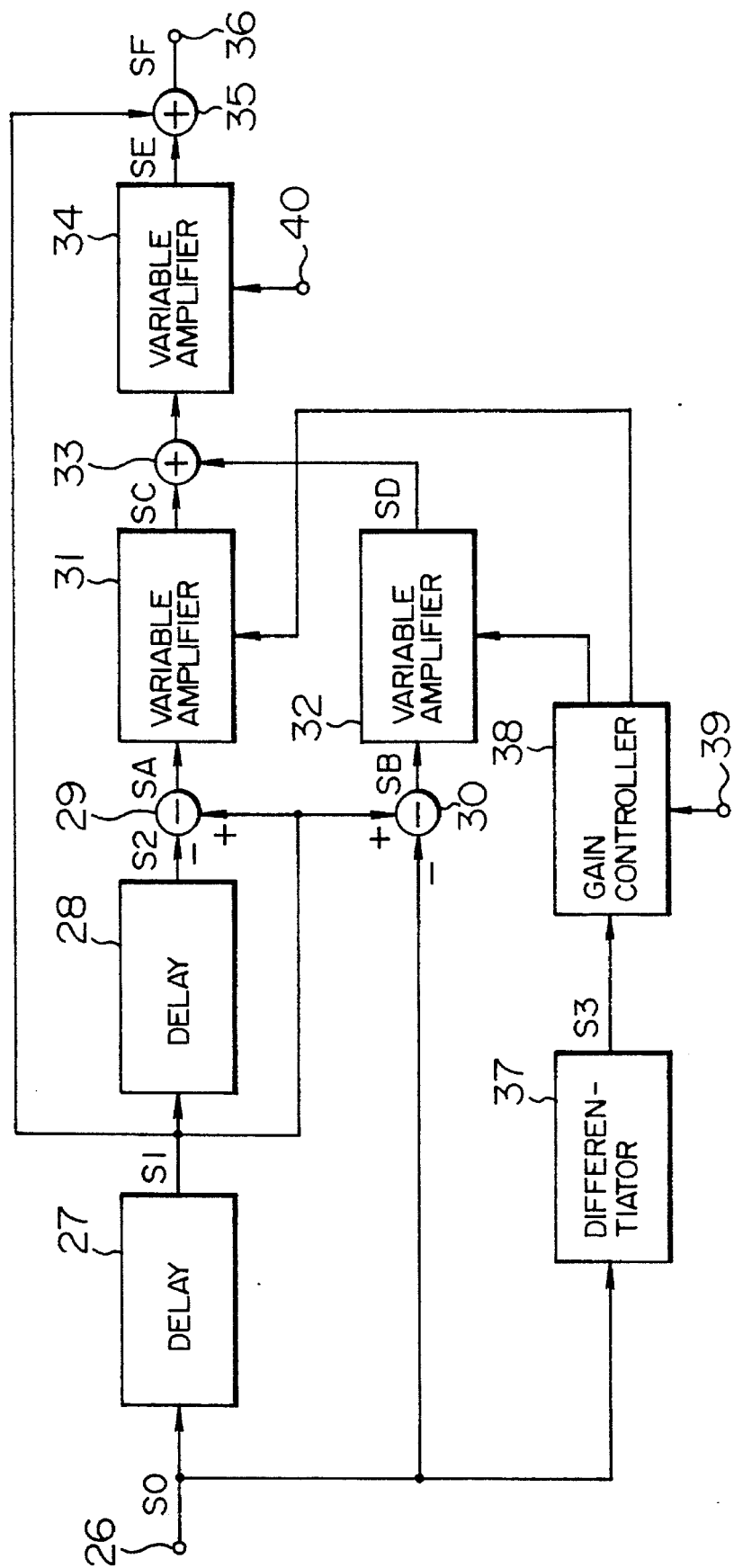
FIG. 13 is a circuit diagram showing another concrete example of the contour circuit which can be used in the video signal processing circuit of FIG. 10.

FIG. 13 is a circuit diagram showing another concrete example of the contour circuit which can be used in the video signal processor 15. Numeral 26 denotes an input terminal, 27 and 28 delay circuits, 29 and 30 subtracters, 31 and 32 variable gain amplifiers, 33 an adder, 34 a variable gain amplifier, 35 an adder, 36 an output terminal, 37 a differentiator, 38 a gain controller, and 39 and 40 input terminals.

Figure 14:
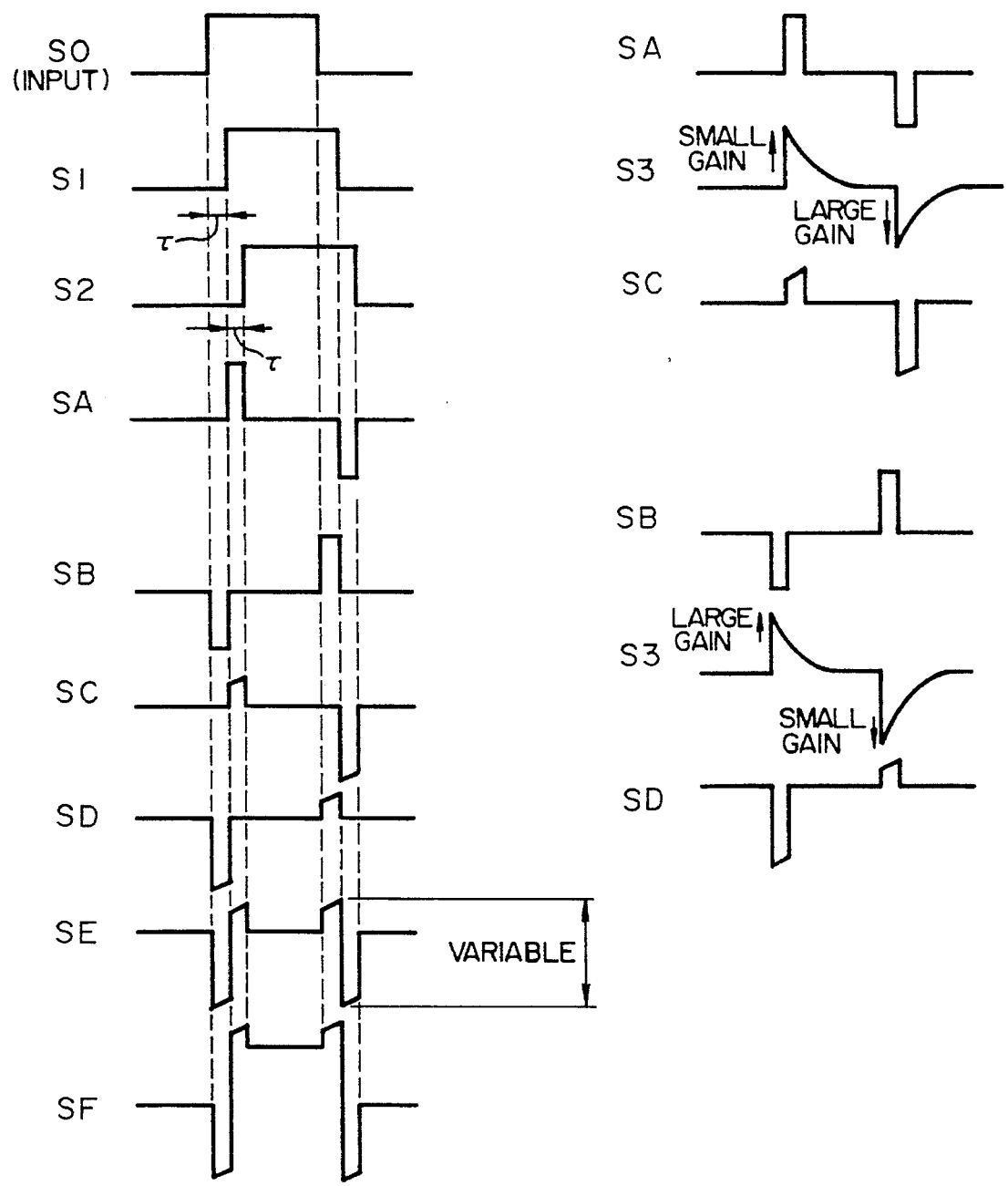
FIG. 14 is a waveform diagram showing signals of various positions in FIG. 13.

FIG. 14 is a waveform diagram showing signals at various locations in FIG. 13. Components corresponding to those of FIG. 13 are denoted by like characters.

With reference to FIGS. 13 and 14, a luminance signal S0 inputted from the input terminal 26 is successively delayed by minute times $\tau$ in the delay circuits 27 and 28. A luminance signal S1 outputted from the delay circuit 27 is supplied to the subtracters 29 and 30. In the subtracter 29, an output luminance signal S2 delayed by time $\tau$ of the delay circuit 28 is subtracted from the luminance signal S1. In the subtracter 30, an input luminance signal S0 leading by the time $\tau$ is subtracted from the luminance signal S1. From the subtracter 29, a contour signal SA is obtained. At timing immediately succeeding the contour of the luminance signal S1, the contour signal SA has a positive polarity for rising contour and a negative polarity for falling contour. From the subtracter 30, a contour signal SB is obtained. At timing immediately preceding the contour of the luminance signal S1, the contour signal SB has a negative polarity for rising contour and a positive polarity for falling contour. These contour signals are supplied to the variable gain amplifiers 31 and 32, respectively.

Furthermore, the input luminance signal S0 is supplied to the differentiator 37 and subjected to differential processing therein. As a result, the differentiator 37 outputs a differential signal S3 which has a positive polarity for rising contour and has a negative polarity for falling contour. Such a differential signal S3 is supplied to the gain controller 38. Usually, the gain controller 38 sets gains of the variable gain amplifiers 31 and 32 to equal values such as unity. If the optical disk 10 shown in FIG. 10 is a video CD and the disk discriminator 17 shown in FIG. 10 discriminates it, however, a control signal is supplied to the input terminal 39 by the microcomputer 19 for television shown in FIG. 10, and the gain controller 38 controls gains of the variable gain amplifiers 31 and 32 as described below.

That is to say, in the variable gain amplifier 31, the gain is set to a small value during the duration of positive polarity of the differential signal S3 and the gain is set to a large value during the duration of negative polarity of the differential signal S3. The duration of the positive polarity of the differential signal S3 and the duration of the negative polarity thereof are coincident in timing with the positive polarity portion and the negative polarity portion of the contour signal SA, respectively. As a result, a contour signal SC outputted from the variable gain amplifier circuit 31 is compressed in amplitude of its positive polarity portion and expanded in amplitude of its negative polarity portion. In the variable gain amplifier 32, the gain is set to a large value during the duration of positive polarity of the differential signal S3 and the gain is set to a small value during the duration of negative polarity of the differential signal S3. The duration of the positive polarity of the differential signal S3 and the duration of the negative polarity thereof are coincident in timing with the negative polarity portion and the positive polarity portion of the contour signal SB, respectively. As a result, a contour signal SD outputted from the variable gain amplifier circuit 32 is expanded in amplitude of its negative polarity portion and compressed in amplitude of its positive polarity portion.

These contour signals SC and SD are added together in the adder 33. A resultant sum signal is supplied to the variable gain amplifier 34, having a gain adjusted by a signal supplied from the input terminal 40, and the gain adjusted signal SE is added to the contour portion of the luminance signal S1 outputted from the delay circuit 27 to provide the signal SF.

In the present embodiment, the peak of shoot is suppressed on the white side of the signal for the contour of the video image, whereas the shoot of the black side becomes large. Without hampering the sharpness of the contour portion, therefore, "blooming" caused by shoot of the white side can be suppressed.

As described above, gain values of the variable gain amplifiers 31 and 32 are equally set to a constant value in a case other than reproduction of a video CD. As represented by SC in FIG. 12, the luminance signal obtained from the adder 35 is emphasized in contour. In a case of the liminance signal reproduced from a video CD, however, positive polarity portions of the contour signals SC and SD respectively outputted from the variable gain amplifiers 31 and 32, are compressed by changes of gain values of the variable gain amplifiers 31 and 32. Immediately after a rising contour and immediately before a rising contour, therefore, a luminance signal SF supplied from the adder 35 to the output terminal 36 is little emphasized. As compared with contour in a case other than reproduction of a video CD, therefore, emphasis action is lowered, and hence block noise and mosquito noise become inconspicuous.

According to the present invention, the optical disk device is disposed apart from the high voltage generating section and the tuner circuit as heretofore described. As a result, influence of dust and noise is reduced.

Furthermore, according to the present invention, the optical disk device is shielded. When dust is attracted to the high voltage generating section, therefore, dust does not enter the optical disk device. In addition, noise generated by the optical disk device does not arrive at the tuner circuit. Therefore, restrictions on disposition location of the optical disk apparatus can be largely relaxed.

Furthermore, besides the video signal, information concerning the video signal is also supplied to the display section. As a result, the video signal can be optimally controlled, and video images of high picture quality can be displayed.

We claim:

1. A television apparatus for reading out a video signal recorded as digital information on an optical disk and displaying an image of the read out video signal, said television apparatus comprising:

a television set, including a high voltage applying section an anode electrode, and display screen;

an optical disk device disposed in said television set in a position apart from said high voltage applying section and said anode electrode; and a conductive shield member shielding said optical disk device, said optical disk device adapted for reading out from the optical disk the video signal and control information concerning the video signal and causing said television set to display an image of the read out video signal on said display screen, said optical disk device including controlling means responsive to read out control information indicating that the read out video signal is a still picture signal for darkening the brightness of said television set display screen, and responsive to read out control information indicating that the read out video signal is a motion picture signal for darkening the brightness of said television set display screen and lowering the contour effect in signal processing of the motion picture signal.

2. A television apparatus according to claim 1, wherein said television set further includes a tuner circuit disposed apart from said optical disk device.

3. A television apparatus for reading out a video signal recorded as digital information on an optical disk and displaying an image of the read out video signal, said television apparatus comprising:

a television set including a display screen;

means within said television set for reading out from the optical disk a video signal and control information concerning the video signal;

means for displaying an image of the read out video signal on said television set display screen; and controlling means responsive to read out control information indicating that the read out video signal represents a still picture to be displayed on said television set display screen for darkening the brightness of said television set display screen.

4. A television apparatus for reading out a video signal recorded as digital information on an optical disk and displaying an image of the read out video signal, said television apparatus comprising:

a television set including a display screen;

means within said television set for reading out from the optical disk a video signal and control information concerning the video signal;

means for displaying an image of the read out video signal on said television set display screen;

a microcomputer within said television set; and controlling means responsive to read out control information indicating that the read out video signal represents a still picture to be displayed on said television set display screen, for controlling said microcomputer to adjust the picture quality and to darken brightness of said television set display screen.

5. A television apparatus for reading out a video signal recorded as digital information on an optical disk and displaying an image of the read out video signal, said television apparatus comprising:

a television set including a display screen;

means within said television set for reading out from the optical disk a video signal and control information concerning the video signal;

means for displaying an image of the read out video signal on said television set display screen; and controlling means responsive to read out control information indicating that the read out video signal is a motion picture signal, for darkening the brightness of said television set display screen and lowering the contour effect in signal processing of the motion picture signal.

6. A television apparatus for reading out a video signal recorded as digital information on an optical disk and displaying an image of the read out video signal, said television apparatus comprising:

a television set including a display screen;

means within said television set for reading out from the optical disk a video signal and control information concerning the video signal;

means for displaying an image of the read out video signal on said television set display screen;

a microcomputer within said television set; and controlling means responsive to read out control information indicating that the read out video signal is a motion picture signal, for controlling said microcomputer to adjust the picture quality, darken brightness of said television set display screen, and lower the contour effect in signal processing of the motion picture signal.

\* \* \* \* \*